March 2, 1965  G. STAHL ETAL  3,171,198
INJECTOR RAZOR HAVING MEANS FOR FLEXING A FLEXIBLE
DOUBLE EDGE BLADE AS IT MOVES INTO POSITION
AND ARRANGEMENTS FOR OPERATING THE SAME
Filed Nov. 22, 1961  9 Sheets-Sheet 1
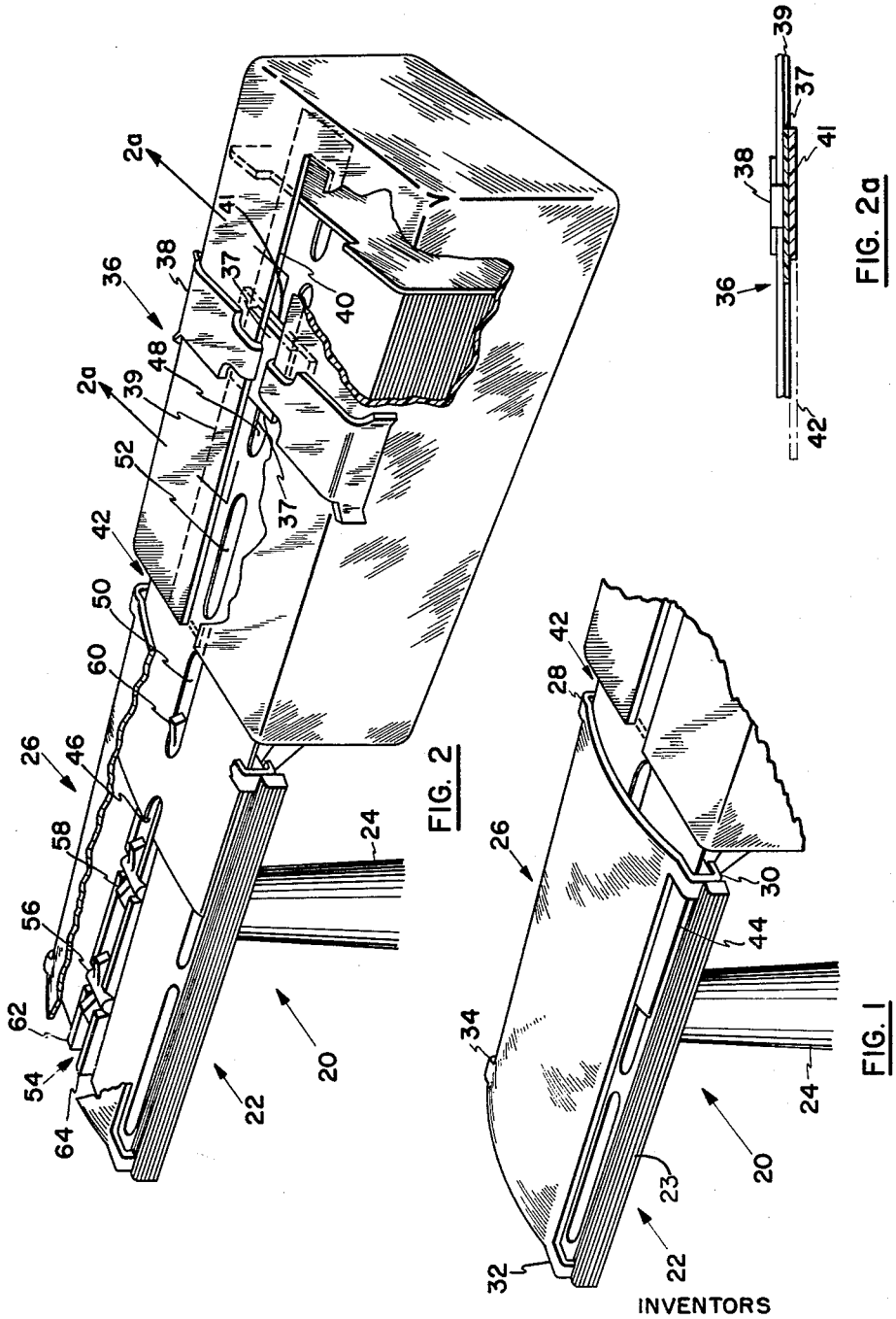
INVENTORS
GERALD STAHL
CHARLES A. JOHNSON, JR.
BY Robert Irving Williams
ATTORNEY March 2, 1965  G. STAHL ETAL  3,171,198
INJECTOR RAZOR HAVING MEANS FOR FLEXING A FLEXIBLE
DOUBLE EDGE BLADE AS IT MOVES INTO POSITION
AND ARRANGEMENTS FOR OPERATING THE SAME
Filed Nov. 22, 1961  9 Sheets-Sheet 2

INVENTORS
GERALD STAHL
CHARLES A. JOHNSON, JR.

BY Robert Irving Williams
ATTORNEY

March 2, 1965 G. STAHL ETAL 3,171,198
INJECTOR RAZOR HAVING MEANS FOR FLEXING A FLEXIBLE
DOUBLE EDGE BLADE AS IT MOVES INTO POSITION
AND ARRANGEMENTS FOR OPERATING THE SAME
Filed Nov. 22, 1961 9 Sheets-Sheet 5

INVENTORS
GERALD STAHL
CHARLES A. JOHNSON, JR.

BY Robert Irving Williams

ATTORNEY

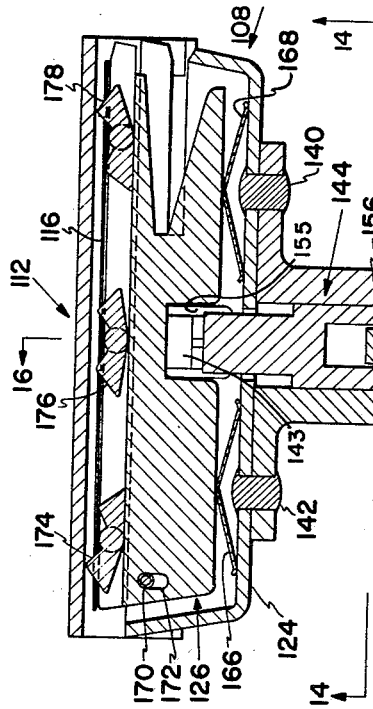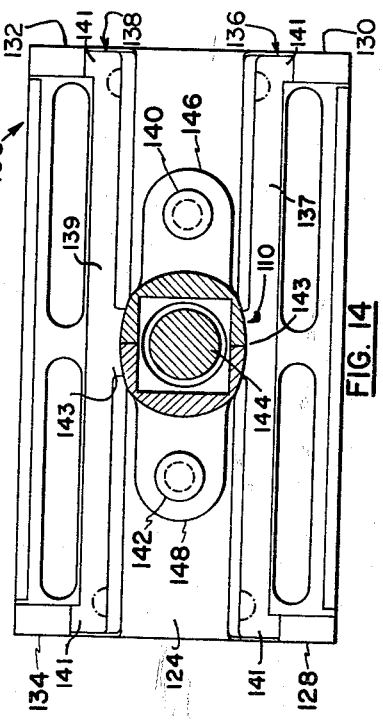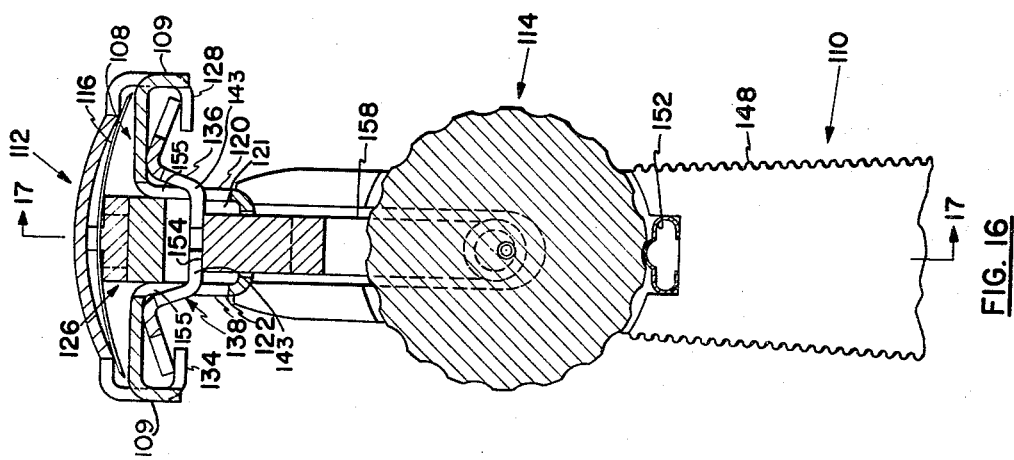

INVENTORS
GERALD STAHL
CHARLES A. JOHNSON, JR.
BY Robert Irving Williams
ATTORNEY

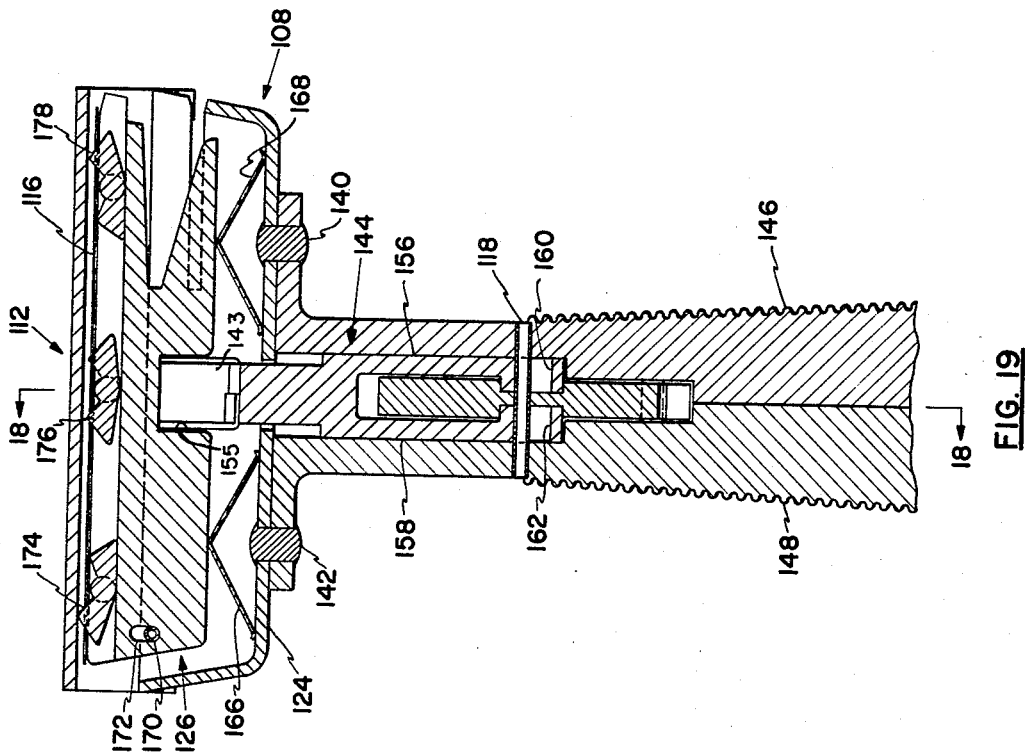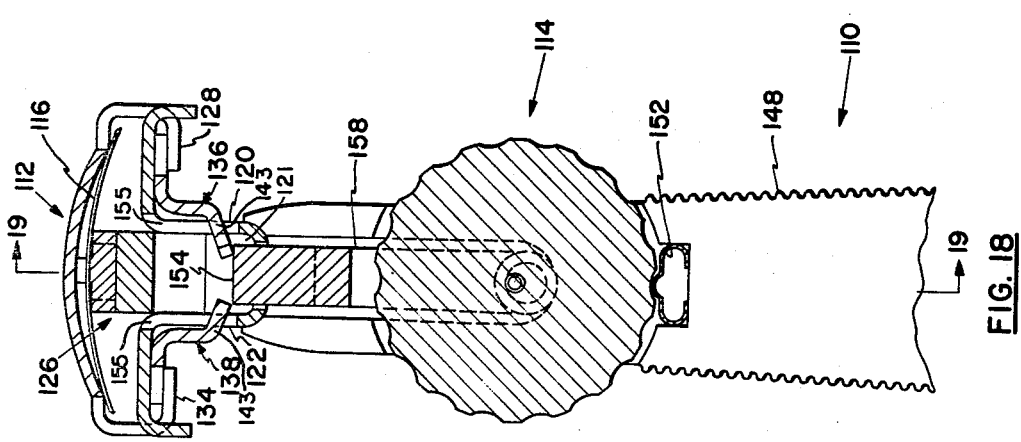

United States Patent Office 3,171,198
Patented Mar. 2, 1965

3,171,198
INJECTOR RAZOR HAVING MEANS FOR FLEXING A FLEXIBLE DOUBLE EDGE BLADE AS IT MOVES INTO POSITION AND ARRANGEMENTS FOR OPERATING THE SAME
Gerald Stahl, Rye, N.Y., and Charles A. Johnson, Jr., Cos Cob, Conn., assignors to Philip Morris Incorporated, New York, N.Y., a corporation of Virginia
Filed Nov. 22, 1961, Ser. No. 154,179
8 Claims. (Cl. 30—65)

This invention relates to safety razors of the type intended to have double-edge blades—and, more particularly, flexible double-edge blades—injected thereinto from a blade dispenser or magazine with each injected blade pushing the previously injected blade out of the razor ahead of it; and, in certain of its aspects, it relates to a razor of the kind described in which the relative position of the blade and the guarding structure is adjustable to permit ready variation in the closeness of the shave.

In its basic form, the safety razor for double-edge blades includes a lower guard plate whereon the blade is positioned, a cap or outer clamping plate above the guard plate and between which and the guard plate the blade is compressed and cambered, and a downwardly-extending handle.

Injector-type safety razors and associated blade magazines for both single and double-edge blades are known to the prior art, with those for single-edge blades having been at least reasonably widely accepted by the shaving public. Difficulties have, however, attended the provision of commercially acceptable injector razors for double-edge blades.

Considering conventional double-edge safety razors, it will be understood that injection of a conventional blade as just defined into shaving position between the cap and guard plate will not be possible without complete separation of these two elements, and/or some manipulation of the razor handle or other element. If such manipulation be necessary, full advantage of convenience from use of the injector principle cannot be realized. Therefore, in order to employ this principle in double-edge razors and obtain a major benefit from its employment, blades have been provided of a kind having a medial slot slightly wider than the thickest stud, rod, pin, or bar extending into the space between or passing through the cap and/or guard plate, this slot being left open at one end. A blade so designed in C- or U-shape can be fed or injected into shaving position open end foremost, straddling all obstructions; and, conversely, can be ejected from the razor closed end foremost; since the edge portions of such blades are only interconnected at one end, difficulties in achieving proper shaving results from the use of thin flexible double-edge blades have ensued.

It is, accordingly, an object of the present invention to provide a safety razor whereinto a double-edge blade having satisfactory shaving qualities may be injected from a blade magazine or dispenser without the razor itself having to be taken apart or otherwise manipulated externally in any way. A further object is to provide such a razor in which a thin, flexible blade may be employed. Another object of the present invention is to provide a double-edge razor of an improved type in which the relative position of the blade and guard may be adjusted through a range of positions for the taking of a heavier or lighter shaving cut. Other objects and advantages of this invention will become apparent upon further reading of this specification.

To achieve the objects of this invention, a guard plate member for a double-edge safety razor is formed with a medial trough running the length thereof. A handle is fixedly and essentially centrally fitted to this guard plate on the side opposite the lengthwise opening of the trough. Within and extending substantially the full length of the trough there is a bar member designated a wobbler bar. At a point near its end adjacent the blade ejection end of the guard plate, the wobbler bar is pivoted to this plate on an axis transverse to the direction of movement of the blade through the razor and parallel to the plane of the blade as it is generally disposed within the razor. In an embodiment of the razor of this invention which is adjustable for various weights of shaving cuts, hereinafter called the adjustable embodiment to distinguish it from the non-adjustable embodiment, the pivot axis of the wobbler bar is at least somewhat loose to allow the bar to be shifted in vertical translation through a limited distance with respect to the guard plate.

Below the wobbler bar and within the trough of the guard plate there is at least one spring which tends always to urge the wobbler bar upwardly toward the cap of the razor of this invention. The cap itself is movable vertically with respect to the guard plate although not actually separable therefrom. Loose connection of the cap and guard plate is effected by corner lugs on the cap which extend through and are bent inwardly around notches in the guard plate. As the wobbler bar is urged upwardly by the aforementioned spring or springs it tends to maintain the cap in extreme outwardly or upwardly spaced relation to the guard plate, and to flex the blade. In the adjustable embodiment of this invention, the particular geometry of this extreme relation varies according to the weight of shaving cut for which the razor is adjusted.

Adjustment of the razor for weight of shaving cut desired is made by an eccentrically bored finger wheel pivoted in the handle acting through an upwardly extending follower and push rod system. At its upper end, the push rod is borne upon by the inner ends of a pair of T-shaped levers pivoted to the underside of the guard plate at their bar portions outward. At the ends of their bar portions these levers bear on the upper surfaces of the aforementioned cap lugs extending through and bent inwardly around notches in the guard plate. Depending upon direction of rotation, turning of the finger wheel will either cause motion of the T-shaped levers to push the cap and the wobbler bar down relative to the guard plate against the force of the springs below the wobbler bar, or permit motion of these levers to allow the cap and the bar to rise up on account of the force of these springs.

The razor blade will be located on top of the wobbler bar, that is, between the wobbler bar and the razor cap. Accordingly the blade will follow vertical motion of the cap and bar in keeping with turning of the finger wheel. The higher the cap and bar are positioned with respect to the guard plate, the greater will be the exposure of the blade edges above this plate and the heavier the shaving cut which can be taken. Conversely the closer the razor cap, blade, and wobbler bar are brought down to the guard plate, the less will the blade edges be exposed and a finer or lighter shaving cut will be obtained.

The upper surface of the wobbler bar whereon the blade is located in shaving position is provided with a groove running its full length, that is, parallel with the trough in the guard plate wherein the wobbler bar itself is located. Within this groove and in sequence along the length thereof there are pivoted a plurality of wobbler pawls. These pawls are generally V-shaped members pivoted essentially at their apices and having their open or non-pointed sides upward. The pivot axis of each pawl in the wobbler bar is parallel to that of this bar in the guard plate. The purpose of the wobbler pawls is to enter slots or other perforations in the razor blade upon being appropriately pivoted or tilted to maintain the blade in correct shaving location on the wobbler bar, and yet not impede the ejection of an old or used blade from the razor nor the injection of a new of fresh blade into the razor.

At its end opposite that near which it is pivoted to the guard plate, and entirely below the aforementioned groove, the wobbler bar is provided with a notch extending for the full width of the bar and for a determine distance along its length, past at least one wobbler pawl for example. This notch, which has an open and larger end at the end of the wobbler bar, has a flat upper surface which slopes somewhat downwardly from the end of the bar. The lower surface of the notch is also flat, but slopes upwardly from the end of the bar. These upper and lower surfaces of the notch do not meet on a line, but are connected by a short vertical surface. The purpose of this notch is to receive a positioning tongue affixed to a blade magazine or dispenser.

At its end adjacent that of the wobbler bar which is notched, the guard plate is provided with a horizontal slot in each of its two vertical portions which define the trough wherein the wobbler bar is located. These slots are cut back substantially as far in the vertical trough-defining portions of the guard plate as the notch is in the wobbler bar. The slots are relatively thin, having a vertical depth substantially equal to or a little less than that of the vertical surface connecting the upper and lower surfaces of the bar notch. The vertical position of the horizontal slots in the guard plate is such that when the wobbler bar is fully raised by the spring or springs below it in the guard plate trough, the lower edges of these slots at their entrance or open ends will be not appreciably lower than the lower or outer edge of the lower surface of the notch in the wobbler bar.

The purpose of the slots in the trough-defining vertical portions of the guard plate, like that of the notch in the bar, is to receive a positioning tongue integral with a blade magazine. This tongue is in the form of a channel member of which the web is intended to enter the guard plate slots and the wobbler bar notch with the flanges in close sliding relationship to the aforementioned trough-defining vertical portions to locate the blade magazine transversely with respect to the razor. Precise relative transverse location of the razor and the blade magazine one to another is needed to prevent rubbing and dulling of blade edges on razor structures as new blades are injected from the magazine into the razor.

When a magazine tongue of the kind described is fitted into the slots in the guard plate it will bear on the upwardly slanting lower surface of the wobbler bar notch. As the tongue is slid farther into the guard plate slots it will also advance along the lower surface of this notch. Because of the inclined nature of this surface, the action of the tongue on the bar will be to pivot it around its axis in the guard plate to depress the notched end of the bar against the force of the spring below it. Travel of the tongue will be stopped by its striking either the ends of the slot in the guard plate or the end of the notch in the bar or the slot and notch ends essentially simultaneously.

When the wobbler bar has been depressed by full insertion of the magazine tongue the razor will be in condition to receive a new blade from the magazine. The magazine itself will be in such fixed relation to the razor that its blade outlet slot will be suitably aligned with the razor above the depressed wobbler bar so that as new blade is fed from the magazine it will strike against an end of the old or used blade already in the razor. Continued feeding or injection of the new blade will drive the old blade over the wobbler pawls, all the way along the wobbler bar, and finally out the far or ejection end of the razor.

In the course of ejection of the old blade, the new blade itself will have been overriding and picking up the wobbler pawls, and coming into correct position for shaving on the wobbler bar. With the old blade fully ejected and the new blade fully injected, the blade magazine may be withdrawn from the razor to remove the magazine tongue from the slots in the guard plate and the notch in the wobbler bar. Once this tongue has been removed, the wobbler bar and the new blade upon it will be pushed up snugly for their full lengths against the razor cap by action of the spring or springs below the bar. Assuming that no particular adjustment of blade exposure over the guard plate is desired in the adjustable embodiment of this invention, the razor will then be in full condition for shaving use with a new blade.

The invention accordingly comprises an article of manufacture possessing the features, properties, and the relation of elements which will be exemplified in the articles hereinafter described and the scope of the application of which will be indicated in the claims.

The nature and substance of this invention will be more clearly perceived and fully understood by referring to the following description and claims taken in connection with the accompanying drawings in which:

FIGURE 1 represents a perspective view from above of the non-adjustable embodiment of the injector razor of this invention with a blade magazine in blade-injecting alignment therewith and a new blade partly injected thereinto;

FIG. 2 represents a view similar to that of FIG. 1 but with the razor cap substantially broken away particularly showing the partly injected blade overlying a portion of the wobbler bar and one of the wobbler pawls;

FIG. 2a is a fragmentary sectional view along the line 2a—2a of FIG. 2;

Figure 4:
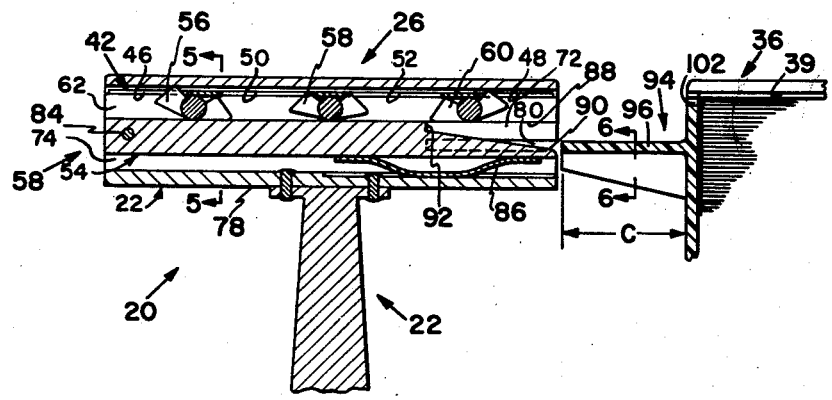
Figure 5:
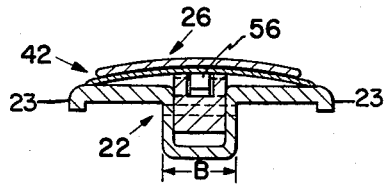
Figure 6:
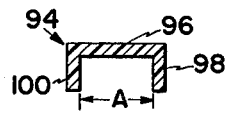
Figure 7:
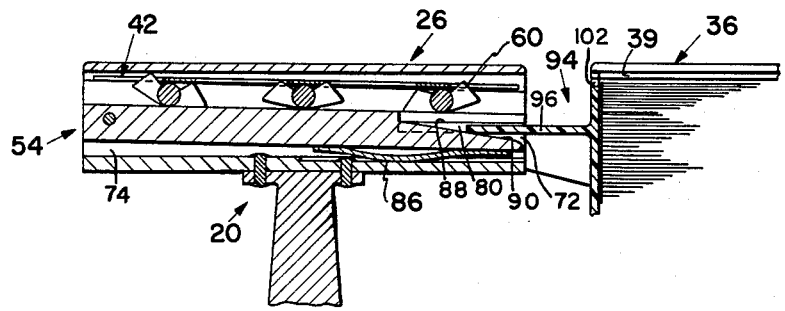
Figure 8:
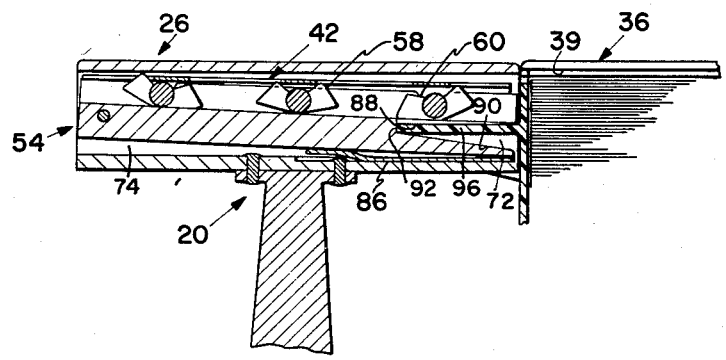
Figure 9:
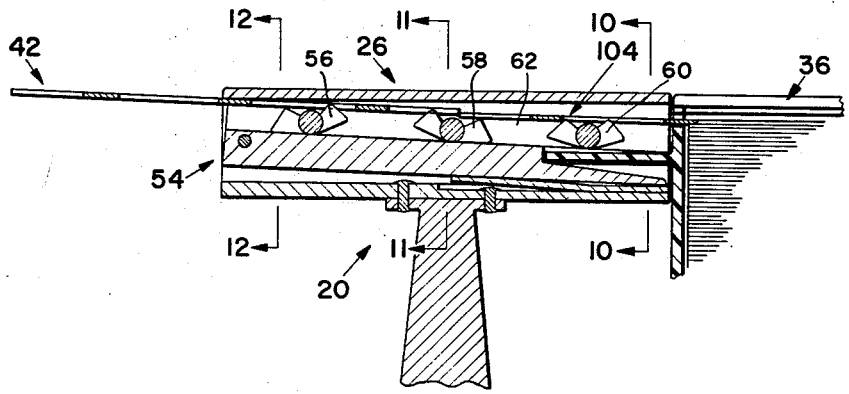
Figure 10:
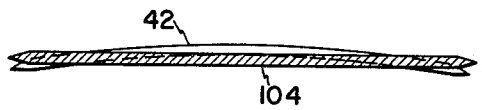
Figure 11:
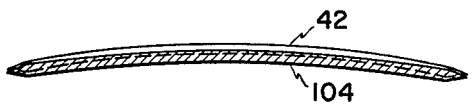
Figure 12:
Figure 13:
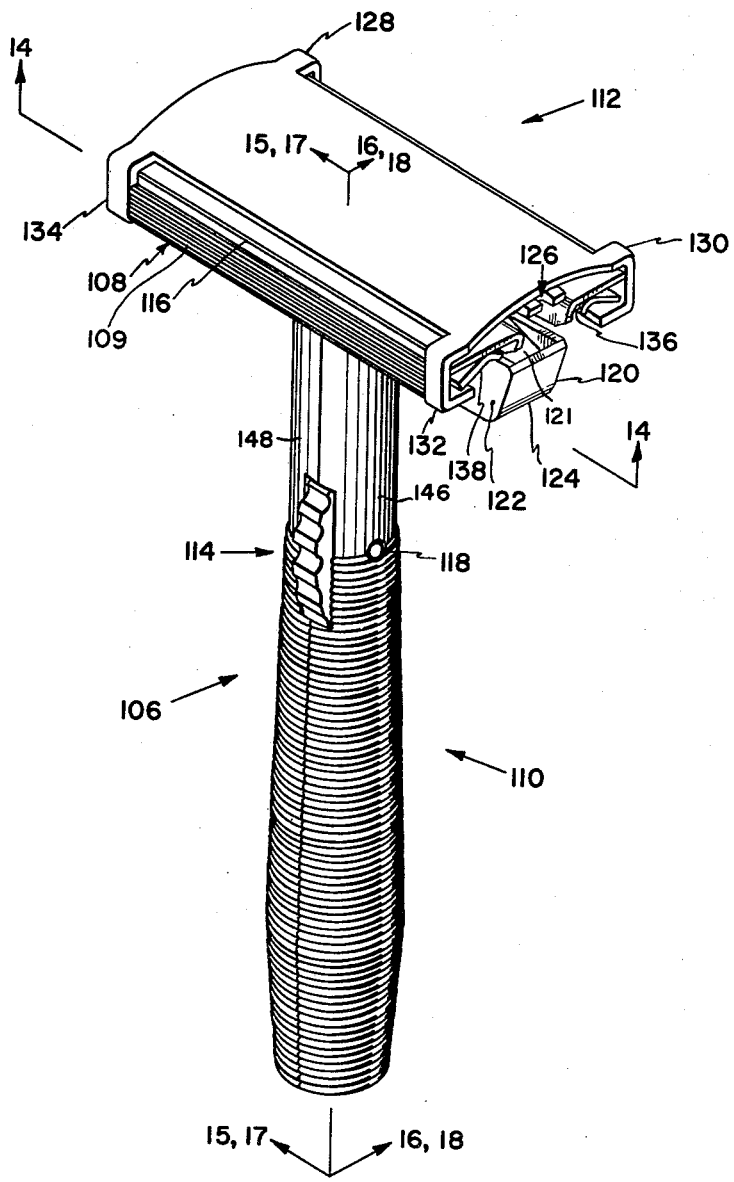
Figure 15:
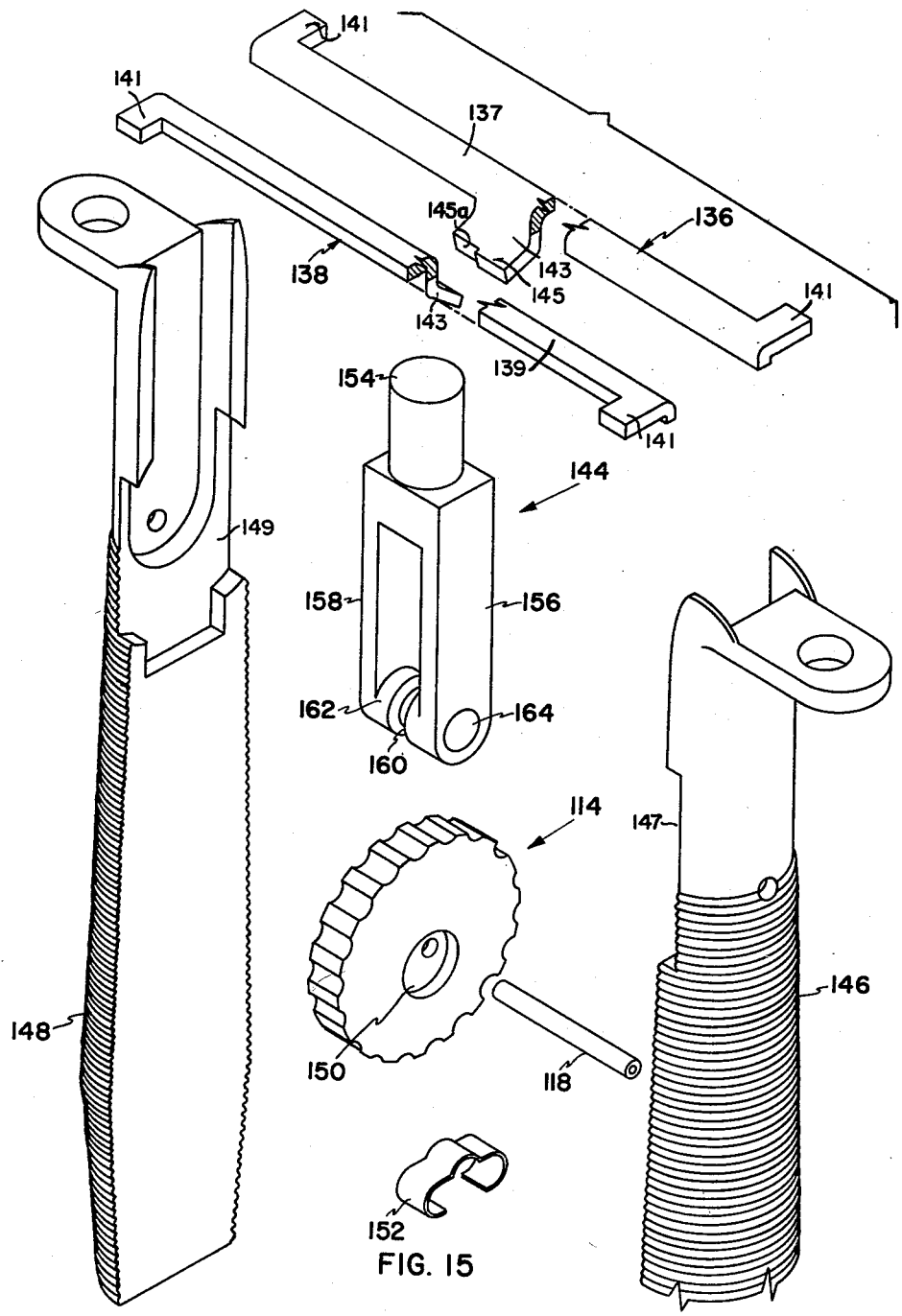
Figure 20:
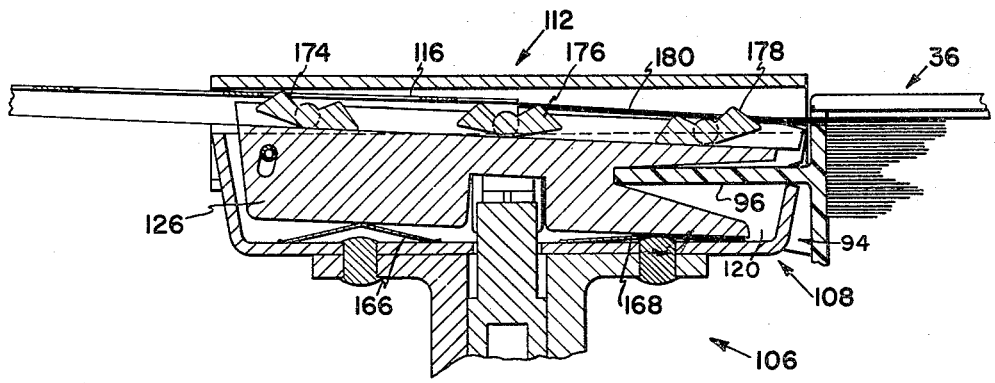
Figure 21:
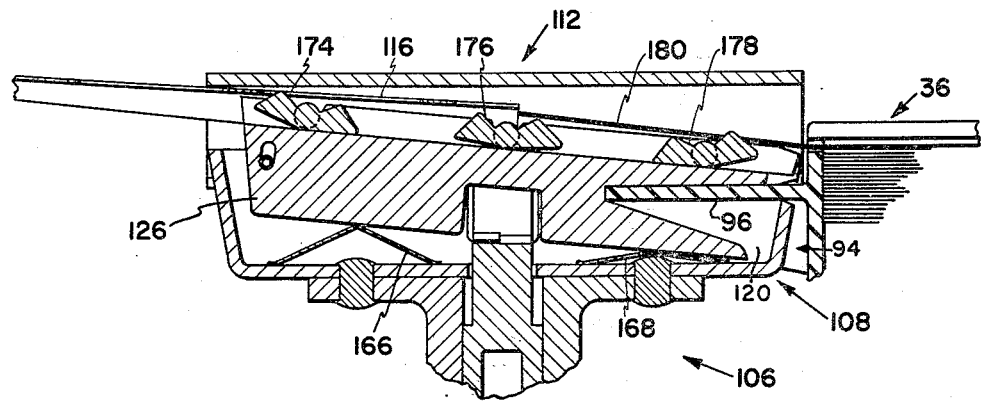

FIG. 4 represents a view in longitudinal sectional elevation on a medial plane through the head of the razor of FIG. 1 taken along the line 4—4 therein according to the direction of the arrows, and particularly showing a blade in shaving position between the wobbler bar and the razor cap and also a portion of a blade magazine approaching the razor in alignment for the tongue of the magazine to depress the wobbler bar of the razor preparatory to the injection of a new blade into the razor;

FIG. 5 represents a view in transverse sectional elevation through the razor head of FIG. 4 taken along line 5—5 therein according to the direction of the arrows particularly showing the cambered attitude of the blade in the razor;

FIG. 6 represents a view in transverse sectional elevation through the tongue of the blade magazine of FIG. 4 taken along line 6—6 therein according to the direction of the arrows;

FIG. 7 represents a view similar to that of FIG. 4 but with the tongue of the blade magazine partly entered into the slots in the guard plate and the notch in the wobbler bar, and showing the wobbler bar partly depressed;

FIG. 8 represents a view similar to that of FIG. 7 but with the tongue of the blade magazine fully entered into the slots in the guard plate and the notch in the wobbler bar, showing the wobbler bar fully depressed, and showing in exaggerated form the remaining curvature at the right-hand end of the used blade;

FIG. 9 represents a view similar to that of FIG. 8 but with a new blade from the blade magazine injected about half way into the razor, this new blade bearing against one end of the blade initially in the razor to eject the latter blade from the razor;

FIGS. 10, 11, and 12 illustrate in exaggerated form transverse outline views of the left-hand end of the new blade issuing from the blade magazine in contact with the right-hand end of the old blade initially in the razor for progressive conditions of injection of the new blade and ejection of the old blade;

FIG. 13 represents a perspective view from above of a modified form of the invention and shows an adjustable injector razor having a finger wheel whereby blade edge exposure is adjusted projecting beyond the handle;

FIG. 14 represents a view looking upwardly at the underside of the guard plate of the razor of FIG. 13 taken along line 14—14 therein through the handle shown in the direction of the arrows, and particularly showing the outer portions of the T-shaped levers for blade edge exposure adjustment engaged with the cap lugs;

FIG. 15 represents a perspective view in exploded arrangement of the handle, and some of the mechanism within and above it, of the razor of FIG. 13;

FIG. 16 represents a view in transverse sectional elevation on a medial plane through the razor of FIG. 13 taken along line 16—16 therein according to the direction of the arrows, and particularly showing the cap fully lowered with respect to the guard plate to give the least exposure of the blade edges;

FIG. 17 represents a view in longitudinal sectional elevation on a medial plane through the razor of FIG. 13 taken along line 17—17 therein according to the direction of the arrows, and particularly showing the cap fully lowered with respect to the guard plate to give the least exposure of the blade edges;

FIG. 18 represents a view in transverse sectional elevation on a medial plane through the razor of FIG. 13 taken along line 18—18 therein according to the direction of the arrows, and particularly showing the cap fully raised with respect to the guard plate to give the greatest exposure of the blade edges;

FIG. 19 represents a view in longitudinal sectional elevation on a medial plane through the razor of FIG. 18 taken along line 19—19 therein according to the direction of the arrows, and particularly showing the cap fully raised with respect to the guard plate to give the greatest exposure of the blade edges; and FIGS. 20 and 21 represent views of the head of the razor of FIG. 13 similar to those given in FIGS. 17 and 19 respectively but with the tongue of a blade magazine fully entered into the slots in the guard plate and the notch in the wobbler bar, and particularly showing the wobbler bar fully depressed and a new blade from the magazine injected about half way into the razor, this new blade bearing against one end of the blade initially in the razor to eject the latter blade from the razor.

Referring now to the drawings in detail, especially FIG. 1 thereof, the non-adjustable embodiment of the razor of this invention is generally designated 20. Razor 20 includes a guard plate generally designated 22 and providing, as shown, integral guard means 23, a handle 24 fastened to the under side of the guard plate at essentially the center thereof, and a cap generally designated 26 surmounting the guard plate. At its corners, cap 26 carries lugs 28, 30, 32, and 34 which extend downwardly through notches 29, 31, 33 and 35 in the corner regions of guard plate 22 (more clearly shown in FIG. 3), and then are bent inwardly toward the longitudinal medial line of the guard plate to effect connection between cap 26 and guard plate 22. The under surface of the cap 26 is concave in section. As exemplified, the connection between the cap and the guard plate is somewhat loose. It would not, however, affect the normal operability of razor 20 if cap 26 were to be joined rigidly to guard plate 22.

In FIGS. 1, 2 and 2a, a blade injector magazine 36 is shown in blade-injecting alinement with the razor 20. The injector magazine exemplified is of the type wherein an upwardly spring-pressed stack of blades is contained in a receptacle and ejected one-by-one thru a slot in the upper portion of one end thereof by a manually operated slide which moves along a longitudinal slot in an upper panel. As shown, the injector magazine 36 comprises a plate 37 which is fixed to a slide 38 which fits into an undercut groove 39, of less width than the blades, in the bottom surface of the upper panel of the magazine. The slide 38 moves in a longitudinal slot 40 in the upper panel of the magazine; and the plate 37 has a thickness equal to the depth of the groove and has on its under side a transversely-extending downward projection 41 of less thickness than the thickness of a single blade, so that, when the slide is moved forwardly from a position wherein the projection 41 is rearward of the position of the stack, with the forward portion of the plate 37 overlying the rear end of the stack, the shoulder at the forward edge of the projection 41 will engage the rear end of the uppermost blade 42 of the stack and move it forwardly out of a slot 102 and fully into the razor when the injector magazine is suitably alined with the razor. The slot 102 is wider than the blades, and extends to either side of the groove 39 in the forward upper end of the magazine and has a thickness slightly greater than the thickness of a single blade and markedly less than the thickness of two blades, so that only the uppermost blade 42 will be ejected thru the slot 102. The slot 102 spans the groove 39, so that after the blade has moved thru the slot, the plate 37 will follow it far enough to move it fully into the razor.

Figure 3:
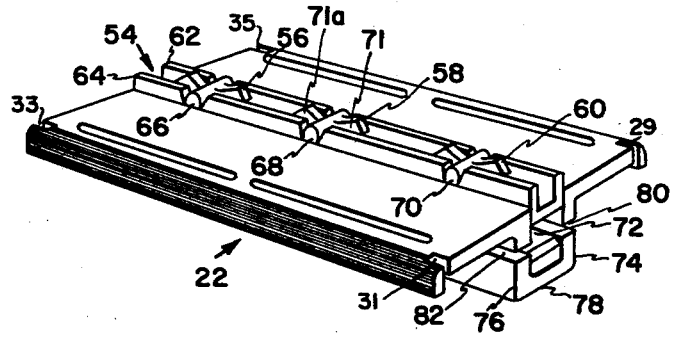
FIG. 3 represents a perspective view from above of the guard plate of the razor of FIG. 1 particularly showing the wobbler bar mounted within the guard plate and the wobbler pawls mounted within the wobbler bar.

For a blade to be fed or injected into razor 20 from magazine 36, especially for it to be injected without its cutting edges being rubbed and dulled on any razor structure, there must be a definite and particular alignment of the magazine with the razor. The means of achieving this alignment will be described in detail hereinafter, but, for purposes of description of FIGS. 1 and 2, such alignment should be assumed to exist between the razor and magazine therein shown. As shown, a thin, flexible double-edge blade 42 has been injected part way into razor 20 with a portion of one of its edges 44 visible below cap 26 and above guard plate 22. In FIG. 2, a small portion of one of the upper panel halves of magazine 36 has been broken away as well as a substantial portion of cap 26 of razor 20. This breaking away shows razor blade 42 to be characterized by end notches 46 and 48 and also by slots 50 and 52. These notches and slots are all located on the longitudinal medial line of the blade. To the extent that blade 42 has been injected into razor 20, it overlies a wobbler bar 54 located in guard plate 22. The wobbler bar carries three wobbler pawls 56, 58 and 60 in its upper side in the groove which is defined by vertical portions 62 and 64. It should be noted that the rearward portion of pawl 60 extends upwardly into slot 50 in razor blade 42. The width of the pawls is only slightly less than that of the blade notches and slots. It should be noted also that wobbler bar 54 is relatively more depressed in guard plate 22 progressively toward its rearward end. In FIG. 3, wobbler bar 54 is shown in normal position. Wobbler pawls 56, 58, and 60 are seen to be located in bar 54 by means of pins or trunnions 66, 68, and 70 respectively which are fixedly fitted in the pawls and which ride in slots in vertical portions 62 and 64 of the wobbler bar. On the sides of the trunnion and fixed thereto, each wobbler pawl has depressible end portions 71 and 71a each having a rearwardly and downwardly sloping surface by which that end may be lowered upon contact therewith by the forwardly-moving edge of a blade or of a notch or slot in a blade and the other end thereby raised, and a forwardly sloping surface off which an end edge of a slot in the blade may ride, if desired. The wobbler bar 54 is provided with a longitudinal notch 72; the extent and form of this notch being more clearly seen in subsequent figures such as FIG. 4. Still referring to FIG. 3, however, wobbler bar 54 is seen to be contained largely in a longitudinal and medial trough in guard plate 22, this trough being defined by vertical portions 74 and 76, and a bottom or horizontal portion 78. At their ends adjacent the notched end of wobbler bar 54, vertical portions 74 and 76 are provided with horizontal slots 80 and 82, respectively, the extent and form of slot 80 being more clearly seen in FIG. 4. Slot 82 shown in FIG. 3 is similarly formed in vertical portion 76. It may be noted in FIG. 3, however, that with no downward load exerted on the wobbler bar, the lower edges of slots 80 and 82 are substantially even with or at least not appreciably lower than the rear edge of the lower surface of notch 72.

Referring next to FIG. 4, it may be supposed that injection of razor blade 42 into razor 20 has been completed, and magazine 36 withdrawn from any engagement with the razor. Once fully injected, blade 42 is disposed for its entire length along the upper surface of wobbler bar 54. Specifically it is disposed along the upper surfaces of vertical portions 62 and 64 (FIG. 3) of the wobbler bar. Transverse location of the blade in the razor, that is, its location normal to the plane of the drawing, is maintained by the three wobbler pawls. As shown (FIG. 4), pawl 56 is tilted to have its left-hand (forward) portion extending upwardly into and part of it through blade notch 46 while the end of its right-hand (rearward) portion is borne upon by the material of the blade between notch 46 and slot 50. The material of the blade between the two blade slots is essentially centered over the pivot axis of pawl 58, and the left and right-hand portions of this pawl extend upwardly into slots 50 and 52 respectively. Pawl 60 is tilted to have its right-hand portion extending upwardly into and part of it through blade notch 48 while the end of its left-hand portion is borne upon by the material of the blade between notch 48 and slot 52.

The pivot and spring support means for the wobbler bar are shown in FIGS. 3 and 4. At the left-hand end of bar 54, a pin 84 passes through it and through vertical portion 74 (FIGS. 3 and 4) and portion 76 (FIG. 3) of guard plate 22. This pin will preferably be fixed in the vertical portions of the guard plate trough with the wobbler bar free to pivot around it. Underlying and pressing upwardly against the wobbler bar at its right-hand end is a spring 86 which is supported on the bottom or horizontal portion 78 of the guard plate trough. This spring will conveniently although not necessarily be a leaf spring as shown. Horizontal portion 78 may be stepped down slightly on its upper surface to receive spring 86.

The upward force of spring 86 exerted on wobbler bar 54 will be transmitted by this bar to blade 42 as the bar attempts to pivot counterclockwise on its pivot axis. Blade 42 which underlies cap 26 will press upwardly in turn against this cap to urge the cap away from guard plate 22. Upward movement of cap 26 is limited by its lugs 28, 30, 32, and 34 (FIG. 1) bearing against the under surface of the guard plate. As blade 42 is pushed up substantially along its longitudinal medial line by the wobbler bar and held down near its longitudinal or cutting edges by cap 26 of the razor, the blade which is relatively quite thin and flexible will tend to be cambered to conform with the cap which is concave downward in transverse cross section. This cambered attitude of the blade may be seen clearly in FIG. 5 taken in sectional elevation through razor 20 along line 5—5 in FIG. 4.

Still referring to FIGS. 3 and 4, longitudinal notch 72 in the end of wobbler bar 54 opposite the end of this bar whereat the bar is pivoted may be seen to have an upper surface 88 which is flat and normally horizontal; a lower surface 90 which is smooth and which slopes upwardly from the open end of the notch, and a short vertical end surface 92. Slots 80 and 82 in vertical portions 74 and 76 of the guard plate are substantially coextensive with notch 72 in the longitudinal sense. Slot 80 is shown partly in full and partly in dashed outline beyond wobbler bar 54. The vertical depths of slots 80 and 82 are essentially equal to each other and preferably substantially the same as that of end surface 92 of notch 72.

Shown alongside razor 20 in FIG. 4 but not in any engagement with the razor is blade magazine 36. It may be supposed that blade 42 in razor 20 has been used and dulled, and that it is now desired to replace this blade with another one from the blade magazine. A feature of the magazine to be noted in particular is the tongue 94 extending from its left-hand side toward razor 20. This tongue, which is shown also in FIG. 6 taken in transverse sectional elevation through the tongue along line 6—6 in FIG. 4, is configured as a channel member having a web 96 and downwardly extending flanges 98 and 100. Tongue 94 should be thought of as being essentially centered transversely in the left-hand panel of magazine 36 with respect to slot 102 above it in this panel wherethrough new blades issue from the magazine. The lower longitudinal edge of web 96 as shown in FIG. 4 is seen to be substantially aligned vertically with the open end of slot 80 in guard plate vertical portion 74.

The flanges of tongue 94 are shown as being tapered in the vertical plane, but such tapering is not essential for the utility of the tongue. Web 96 of tongue 94 has a thickness which is only slightly less than the vertical depth of slots 80 and 82 in the vertical portions of the guard plate trough, and the distance A (FIG. 6) between the inner, facing surfaces of flanges 98 and 100 is only slightly greater than the distance B (FIG. 5) between the outer non-facing surfaces of guard plate trough vertical portions 74 and 76 (FIG. 3). The length C of tongue 94 is substantially equal to the lengths of wobbler bar notch 72 and guard plate trough vertical portion slots 80 and 82.

According to the relative dimensions given, and supposing that blade magazine 36 is moved directly to the left in FIG. 4 in proper alignment with razor 20 normal to the plane of the drawing, web 96 of tongue 94 will enter slots 80 and 82 (FIG. 3) in vertical portions 74 and 76 of the guard plate trough with a close sliding fit therewithin, while flanges 98 and 100 will also slide closely along the outer surfaces of these vertical portions. It will be understood, as it is illustrated in FIGS. 7 and 8 (taken in conjunction with FIG. 3), that as web 96 of tongue 94 enters slots 80 and 82 it will bear upon lower surface 90 of wobbler bar notch 72, and tend to depress the right-hand end of the wobbler bar because of the inclined nature of this surface.

Referring next to FIG. 7, blade magazine 36 has been moved somewhat to the left with respect to razor 20 from its position shown in FIG. 4. Web 96 of magazine tongue 94 has entered part way into slot 80 and slot 82 (not shown in FIG. 7, but shown in FIG. 3) in the guard plate trough vertical portions and into wobbler bar notch 72 to depress wobbler bar 54 to some extent at the right-hand end, and partly flatten out leaf spring 86. As the right-hand end of the wobbler bar goes down, razor blade 42 will become relatively less tightly held between bar 54 and cap 26 at its right-hand end than at its left-hand end where there is little or no depression of the wobbler bar. Being less tightly held at its right-hand end, the resilient blade will tend to flatten out there; that is, it will tend to lose its cambered attitude shown in FIG. 5. However, due largely to the very fact that the blade is still held relatively tightly and fully cambered at its left-hand end between wobbler bar 54 and cap 26, there will still be at least some camber retained in blade 42 at its right-hand end even though there be little or no upward force exerted by the wobbler bar on the blade at this end. Indeed, as wobbler bar 54 goes down at its right-hand end, blade 42 does not flatten out there at a rate to fully follow the bar, but tends to remain out of contact with bar 54.

Referring next to FIG. 8, blade magazine 36 has been moved as far to the left with respect to razor 20 as it can go; that is, it has been moved to the left until the left-hand end of web 96 of channel-shaped tongue 94 has hit solidly against end surface 92 of wobbler bar notch 72 and/or against the ends of slots 80 and 82, said slot 80 being seen in vertical portion 74 in FIG. 7, while in FIG. 8 web 96 completely fills the slot 80. Slot 82 not seen in FIG. 8 is shown in FIG. 3 and is similar to slot 80 in shape and is located in vertical portion 76 also seen in FIG. 3. Wobbler bar 54 is now fully depressed at its right-hand end, and leaf spring 86 is fully flattened out. It should be noted that upper surface 88 of wobbler bar notch 72 is now essentially parallel to the plane of tongue web 96 fitted in slots 80 and 82, and is in practically continuous contact with the upper surface of this web.

As wobbler bar 54 is depressed from its position shown in FIG. 7 to that shown in FIG. 8, the right-hand end of blade 42 will become more nearly flat. This end of the blade will not, however, lose its camber entirely because of the blade still being tightly held at its left-hand end between the wobbler bar and cap 26. Likewise as bar 54 is depressed to its position shown in FIG. 8, blade 42 will tend more and more to rise with respect to the bar and the wobbler pawls upon it, and become disengaged from at least pawls 58 and 60. With wobbler bar fully depressed by tongue 94 of magazine 36, injection of a new blade from the magazine into the razor may be started.

This new blade will be essentially flat as it issues from slot 102 in the magazine, and it must bear against the right-hand end of blade 42 to push out or eject this old blade from razor 20. Because the right-hand end of blade 42 is still at least somewhat cambered, the flat left-hand end of an out-coming blade from magazine 36 will only be able and will only need to make two-point or chordal contact with the old blade to exert a stable, positive push on it. Thus the old and new blades will not have to be so accurately aligned initially to permit linear contact across the full width of their abutting ends as they would have to be if both blades were essentially flat or if both had the same chamber.

Referring next to FIG. 9, razor 20 and blade magazine 36 are in the same positions relative to each other as in FIG. 8 except that finger slide mechanism shown in FIG. 1 will have been moved sufficiently far to the left to discharge a new blade 104 about half way out of the magazine and into the razor. This new blade is in end-to-end chordal contact with old blade 42 which has in turn been discharged about half way out of razor 20. Incoming or partly injected blade 104 has fully overridden wobbler pawl 60, and partly overridden pawl 58. It is to be noted that the ends of the right and left-hand portions of each wobbler pawl are provided with contours which are at least somewhat slanted and rounded. These contours, especially those of the ends of the right-hand portions of the pawls, allow easy overriding of the pawls by blades moving through the razor from right to left as shown in the drawing. The pawls are, of course, also individually configured and mutually spaced according to the lengths of blade material separating the medial slots and notches in the blades, and likewise according to the length of these slots and notches themselves.

As new blade 104 is pushed into razor 20 by action of finger slide 38, it will in due course come into contact with the upper surfaces of vertical portions 62 and 64 (FIG. 3) of wobbler bar 54 (surface 62 being shown in FIG. 9) and at least the longitudinal edges of the under side of razor cap 26. With continued injection of the new blade into the razor, its contact with these razor elements will cause it to become increasingly cambered transversely, particularly at its left-hand end, to conform with the cap. Of course, correspondingly, as old blade 42 is pushed farther to the left by new blade 104 it will become increasingly cambered at its right-hand end as it is more tightly gripped toward this end between wobbler bar 54 and cap 26. For essentially all of the travel of new blade 104 into razor 20, therefore, particularly bearing in mind that the right-hand end of blade 42 was at least somewhat cambered while the left-hand end of blade 104 was essentially flat upon the initial contact of these blade ends, the right-hand end of the old blade will be more cambered than the left-hand end of the new blade to allow maintenance of two-point contact between the ends of the blades for exertion of a steady ejecting push by new blade 104 upon old blade 42.

Referring next to FIGS. 10, 11, and 12, the pushing action of new blade 104 to eject old blade 42 from the razor as it itself is injected into the razor is shown by progressive transverse outline representations of the left-hand end of the new blade bearing against the right-hand end of the old blade, all as seen in the direction of blade travel. In FIG. 10 new blade 104 has just come into contact with old blade 42. The left-hand end of the new blade is essentially flat while the right-hand end of the old blade has at least some camber, although appreciably less than it had when fully cambered according to the conditions of FIG. 5. In FIG. 11 the outline blade ends are shown corresponding to a condition of the new blade injected about half way into the razor, that is, the condition of FIG. 9. Going from the condition of FIG. 10 to that of FIG. 11, the cambers of the right-hand end of old blade 42 and the left-hand end of new blade 104 have both increased, but the former is still somewhat greater than the latter. Finally in FIG. 12 the right-hand end of old blade 42 and the left-hand end of new blade 104 are shown corresponding to a condition of the old blade almost fully ejected from and the new blade almost fully injected into the razor. Both blade ends have substantially the same full camber shown in FIG. 5, with the right-hand end of the old blade being still slightly more cambered than the left-hand end of the new blade.

The stroke of finger slide 38 (FIG. 1) of blade magazine 36 is such that it will finally move new blade 104 into essentially the same longitudinal position on wobbler bar 54 as that occupied formerly by old blade 42 according to FIG. 8. The magazine may then be moved to the right relative to razor 20 to withdraw tongue 94 from wobbler bar notch 72 and slots 80 and 82 in vertical portions 74 and 76 of guard plate 22 (FIG. 3). Such withdrawal will allow spring 86 to push up the right-hand end of the wobbler bar to achieve with new blade 104 the condition shown in FIG. 4 with old blade 42, that is, the condition of the blade fully cambered transversely for its whole length between wobbler bar 54 and razor cap 26, and maintained in transverse location within the razor by the wobbler pawls.

Referring next to FIG. 13, razor 106 includes a guard plate 108 and formed, as shown, with integral guard means 109, a handle 110 fastened to the underside of the guard plate at essentially the center thereof, a cap 112 surmounting the guard plate, and a finger wheel 114 for adjustment of the exposure of the edges of blade 116 above the guard plate, this wheel being mounted in handle 110 on shaft 118.

Guard plate 108 is characterized by a longitudinal and medial trough 121, this trough being defined by vertical portions 120 and 122 and a bottom or horizontal portion 124. Contained within this trough is a wobbler bar 126. This bar and vertical portions 120 and 122 defining the guard plate trough are notched and sloted similarly to corresponding parts of the exemplified non-adjustable razor 20 to receive the web portion of a channel-shaped tongue of a blade magazine similar to magazine 36 (FIG. 2).

At its corners, cap 112 is characterized by lugs 128, 130, 132, and 134 which extend downwardly through corner notches in guard plate 108, and then are bent inwardly toward the longitudinal medial line of the guard plate to effect connection between cap 112 and guard plate 108. This connection must be a loose one to allow at least some vertical motion of the cap with respect to the guard plate for variation in the exposure of the edges of blade 116 above the guard plate. Shown in contact with the upper surfaces of the inwardly bent portions of cap lugs 130 and 132 are portions of a pair of levers 136 and 138. The form and function of these levers are described in detail in connection with subsequent figures.

Referring next to FIG. 14, taken with FIG. 13, handle 110 is attached to horizontal portion 124 defining the trough 121 in guard plate 108 by means of two rivets 140 and 142. Within the handle shown in section is a push rod generally designated 144 whose form and function are described in detail hereinafter. Shown also in FIG. 14 are parts of each of the aforementioned levers 136 and 138. These levers are each generally T-shaped with their bar portions 137 and 139 outward and running parallel to the longitudinal edges of guard plate 108. At their ends, these bar portions have tabs 141, which pass above and bear downwardly upon the inwardly bent portions of the cap lugs as shown in FIG. 13.

Levers 136 and 138 are rockable on the underside of guard plate 108 at points intermediate the ends of their stem portions 143. These stem portions, which are shown to only a small extent in FIG. 14, extend inwardly through slots in vertical portions 120 and 122 (as shown in FIG. 16) defining the trough 121 in the guard plate at about the midlengths of these vertical portions. At their inner ends, the stem portions 143 of levers 136 and 138 terminate on the upper end 154 (FIG. 15) of push rod 144 which extends upwardly through not only handle 110, but also through a hole in horizontal portion 124 defining the trough in the guard plate at about the middle of this portion. In FIG. 14 it is to be noted that handle 110, as exemplified, is a composite structure of two handle halves 146 and 148 mating along a vertical plane. Depending on their material, handle halves 146 and 148 may be joined by a cement, rivets, screws, or any other suitable means.

Referring next to FIG. 15, finger wheel 114 is characterized not only by a through central hole for passage of shaft 118, but also by an eccentric counterbored hole in each of its faces. These holes, one of which, 150, is designated on the visible face of the finger wheel, are axially aligned one with the other and of identical diameter. The edge of finger wheel 114 is of scalloped contour. This contour not only allows easy turning of the wheel by the fingers, but also provides a series of engagements for detent spring 152. This spring, like finger wheel 114 and push rod 144 is retained within handle halves 146 and 148. The recessed region 149 in handle half 148 for partial accommodation and working clearance of these elements is visible, and handle half 146 is, of course, recessed similarly at 147.

Push rod 144 is characterized by an upper surface 154 whereon the inner ends of the stem portions of T-shaped levers 136 and 138 rest in the assembled razor. Each stem 143 has the end thereof formed with a protruding portion 145 on one side and a recess 145a on the other side so that when levers 136 and 138 are arranged with stems 143 facing each other and are moved together from the view shown in FIG. 15 the protruding portion 145 of one end 143 will be able to enter the recess 145a of the other end. The lower portion of push rod 144 is bifurcated to fit around finger wheel 114. On the interior surfaces of the lower ends of the two dependent members 156 and 158 defining this bifurcation, the push rod is formed with inwardly extending members 160 and 162 in the form of very short hollow cylinders, that is, rings. These rings, the holes in which such as 164 extend coaxially through dependent members 156 and 158, have an outside diameter only slightly smaller than the bore of the eccentric holes in finger wheel 114.

When razor 106 is fully assembled, rings 160 and 162 fit in these eccentric holes, and in effect act as eccentric followers to raise or lower push rod 144 as the finger wheel is turned on shaft 118. This shaft passes through hole 164 and the matching hole in dependent member 158 and follower ring 162. These holes are large enough to permit full vertical stroke of push rod 144 without interference between this rod and finger wheel shaft 118. It is contemplated that push rod 144 will be made of nylon or some other relatively flexible and resilient material so that dependent members 156 and 158 may be spread without any permanent springing to allow follower rings 160 and 162 to be snapped into the eccentric holes in finger wheel 114. It is, however, within the contemplation of this invention that push rod 144 be made in halves similarly to handle 110, and these halves assembled around the finger wheel.

Referring next to FIGS. 16 and 17, the pivoting engagement of the stem portions of levers 136 and 138 with the underside of the outwardly extended portions of guard plate 108 is apparent, as is the bearing of the inner ends of these stem portions on upper surface 154 of the push rod after these portions have passed through slots in vertical portions 120 and 122 of the guard plate defining the trough therein. The stem portions of levers 136 and 138 also pass through a medially transverse slot 155 in the underside of wobbler bar 126 which is supported above bottom horizontal portion 124 of the trough 121 in guard plate 108 by two leaf springs 166 and 168. Near its left-hand end as shown in FIG. 17, wobbler bar 126 is pivoted in the guard plate trough on pin 170 which is fixed in vertical portions 120 and 122 defining this trough. The hole in the wobbler bar through which pin 170 passes is in the form of a vertical slot 172, which allows some vertical translation of the whole bar 126. As shown in FIG. 17, the wobbler bar is in its lowest position with respect to pin 170.

Wobbler bar 126 is provided with three wobbler pawls 174, 176, and 178 pivoted in a groove in its upper side. These pawls are shown in engagement with razor blade 116 similar to the engagement of pawls 56, 58, and 60 with razor blade 42 in non-adjustable razor 20 shown in FIG. 4. Near its longitudinal or cutting edges blade 116 is held down by cap 112, while it is pushed up medially and cambered by the force of springs 166 and 168 acting through wobbler bar 126. Upward motion of the cap is prevented by levers 136 and 138 pressing down on the four cap lugs of which two, 128 and 134, are shown in FIG. 16. Rotation of levers 136 and 138 around their pivot points on the underside of the guard plate is prevented by push rod 144. As shown in FIGS. 16 and 17, this rod is in its highest position according to the angular orientation of finger wheel 114 in handle 110. With the push rod in this position cap 112 is in its lowest position, and the edges of blade 116 have their least exposure above guard plate 108 to give a relatively light shaving cut.

Referring next to FIGS. 18 and 19, finger wheel 114 has been rotated 180° on shaft 118 from its orientation according to FIGS. 16 and 17 to achieve the conditions shown therein. The finger wheel is detained in position by spring 152 engaged with one of the scalloped regions in the outer periphery of the wheel. Push rod 144 has been pulled down to its lowest position by action of the peripheral surfaces of the eccentric holes in finger wheel 114 on follower portions 160 and 162 of the push rod. As the rod has gone down, levers 136 and 138 have been allowed to pivot on guard plate 108 under the upward pull exerted on them by corner lugs 128, 130, 132, and 134 (128 and 132 being seen in FIG. 18 the others in FIG. 13 of cap 112. Upward force on the whole structure of cap 112 is, of course, exerted by blade 116 pushed by springs 166 and 168 through wobbler bar 126. Accordingly push rod 144 has gone down, cap 112, blade 116, and wobbler bar 126 have all gone up, and the exposure of the edges of the blade above guard plate 108 has been increased substantially to give a relatively heavy shaving cut.

As shown in FIGS. 16 and 18, there are eighteen scalloped regions in the outer periphery of finger wheel 114 with which detent spring may become engaged. This means that there are ten different elevations in which cap 112 and blade 116 may be positioned above guard plate 108. Said in other words, the edges of blade 116 may be detained in ten different exposures above guard plate 108 for as many different weights of shaving cut. It should be noted as a matter of considerable convenience that razor 106 may be held in one hand and wheel 114 manipulated with the fingers of that same hand for variation in blade edge exposure.

Referring finally to FIGS. 20 and 21, in each of these figures blade magazine 36 has been brought up to razor 106 for injection thereinto of new blade 180 and ejection therefrom of old blade 116. Web 96 of magazine tongue 94 has been inserted all the way into the horizontal slots in the right-hand ends of vertical portions 120 and 122 (as shown in FIG. 16) defining the trough in guard plate 108, and likewise all the way into the notch in the right-hand end of wobbler bar 126. The wobbler bar has been depressed fully at its right-hand end, principally against the force of spring 168 and somewhat against the force of spring 166, to effect partial release of old blade 116 from the wobbler pawls.

The finger slide of magazine 36 has been moved sufficiently far to the left to discharge a new blade 180 about half way out of the magazine and into razor 106. This new blade is in end-to-end chordal contact with old blade 116 which has been discharged about half way out of the razor. The mechanics of contact and change of transverse camber of blades 116 and 180 as these blades move through razor 106 are essentially the same as those for blades 42 and 104 moving through razor 20 described in connection with FIGS. 8–12.

The stroke of finger slide 38 (FIG. 1) of blade magazine 36 is such that it will finally move new blade 180 fully onto wobbler bar 126, and displace old blade 116 therefrom. The magazine may then be moved to the right relative to razor 106 to withdraw tongue 94 from the notch in the wobbler bar and the horizontal slots in guard plate trough vertical portions 120 and 122 (FIG. 13). Such withdrawal will allow springs 166 and 168 to push up the right-hand end of the wobbler bar to achieve with new blade 180 the condition shown in FIGS. 17 and 19 with old blade 116, that is, the condition of the blade fully cambered transversely for its whole length between wobbler bar 126 and razor cap 112, and maintained in transverse location within the razor by wobbler pawls 174, 176, and 178. Obviously, since blades can be changed by the injector method as described with finger wheel 114 set to provide the extremes of blade edge exposure shown in FIGS. 16–19, they can also be changed by this method for any setting of the finger wheel giving an intermediate exposure of the blade edges above guard plate 108.

Although this invention has been described with a certain degree of particularity, it is to be understood that the present disclosure has been made only by way of example, and that numerous changes in the details of construction may be resorted to without departing from the spirit and scope of this invention as hereinafter claimed.

The invention claimed is:

1. An injector razor for flexible blades comprising a cap having a concave lower surface, a handle, a guard plate fixed to the handle, guard means integral with the guard plate, means at the corners of the cap and guard plate to maintain the same in association while permitting longitudinal movement of a razor blade through the space therebetween, upwardly-spring-pressed longitudinally-extending means supported on said guard plate and upwardly spring pressed therefrom for guiding a razor blade during its movement through said space and for normally pressing the longitudinal central portion of a razor blade against the lower surface of said cap to flex the blade and normally blocking one end of said space to prevent the insertion therein of a blade in flat condition, and camming means on said pressing means adjacent to said end and operable by the longitudinal movement of the key of an injector magazine for moving at least said end of said pressing means downwardly to permit the injection of the forward end of a blade in flat condition from said magazine between said pressing means and said cap.

2. An injector razor for double-edge blades which comprises a guard plate having an upper side and a lower side, a handle fitted to said guard plate on the lower side thereof, a cap disposed above said guard plate, a bar member extending lengthwise and substantially medially of said guard plate on the upper side thereof between said guard plate and said cap, said bar member having a first end and a second end, and being pivoted near said first end to said guard plate on an axis allowing rotary motion of at least the greater length of said bar member upwardly from said guard plate toward said cap, spring means between said guard plate and said bar member tending to urge at least said second end of said bar member upwardly from said guard plate against said cap, and rockable guide means between said bar member and said cap whereby a double-edge razor blade may be moved between said bar member and said cap and located transversely in shaving position within said razor.

3. An injector razor for double-edge blades which comprises a guard plate having an upper side and a lower side, and characterized by a medial trough extending longitudinally thereof which is defined by two essentially vertical portions and a horizontal portion of said guard plate and which has a longitudinal opening toward the upper side of said guard plate, a handle fitted to said guard plate on the lower side thereof, a cap above said guard plate, a bar member located within and extending substantially the full length of said medial trough in said guard plate, said bar member having a first end and a second end, and being pivoted near said first end to said guard plate on an axis allowing rotary motion of at least the greater length of said bar member both upwardly from said medial trough toward said cap and downwardly into said medial trough toward said horizontal portion defining said medial trough in said guard plate, spring means between said guard plate and said bar member tending to urge said bar member upwardly from said medial trough against said cap, and a guide means between said bar member and said cap whereby a double-edge razor blade moved between said bar member and said cap is located transversely in shaving position within said razor, said bar member being formed at said second end with a notch having a lower surface sloping upwardly from said second end, and said razor being characterized by a horizontal slot in each of said vertical portions defining said medial trough in said guard plate at the ends of said vertical portions adjacent said second end of said bar member, said slots being each at least substantially as long as said notch and having each a lower surface not appreciably lower than the lower edge of said lower surface of said notch when said bar member is fully raised toward said cap by action of said spring means with a razor blade in shaving position within said razor.

4. An injector razor for double-edge blades which comprises a guard plate having an upper side, a lower side, and four extreme corners, said guard plate being characterized by a notch in each of its corner regions, and being characterized further by a medial trough extending longitudinally thereof which is defined by two essentially vertical portions and a horizontal portion of said guard plate and which has a longitudinal opening toward the upper side of said guard plate, each of said vertical portions being characterized by a slot at about the middle of its length, and said horizontal portion being characterized by a hole at about the middle of its length, a handle fitted to said guard plate on the lower side thereof, said handle being characterized by an axial hole in at least its upper portion which is aligned with said hole in said horizontal portion defining said medial trough in said guard plate, and being characterized further by a slot which intersects said axial hole at an intermediate point along the length of said handle, said slot lying in a plane coincidental with the axis of said handle, a cap fitted to said guard plate on the upper side thereof, said cap having a plurality of lugs which pass downwardly through said notches in the corner regions of said guard plate and are bent therebelow to allow a limited amount of vertical motion of said cap with respect to said guard plate, a bar member located within and extending substantially the full length of said medial trough in said guard plate, said bar member having a first end and a second end, and being pivoted near said first end to said guard plate on an axis allowing rotary motion of at least the greater length of said bar member both upwardly from said medial trough toward said cap and downwardly into said medial trough toward said horizontal portion defining said medial trough in said guard plate, said axis being at least somewhat loose to allow a limited amount of vertical translatory motion of the whole of said bar member with respect to said guard plate, spring means between said guard plate and said bar member tending to urge said bar member upwardly from said medial trough against said cap and said cap upwardly from said guard plate, said spring means comprising at least a first spring element located relatively closer to said first end of said bar member than to said second end thereof and a second spring element located relatively closer to said second end of said bar member than to said first end thereof, rockable guide means between said bar member and said cap whereby a double-edge razor blade moved between said bar member and said cap is located transversely in shaving position within said razor, a finger wheel pivoted in said handle within said slot therein on an axis essentially perpendicular to the axis of said handle, said finger wheel projecting at least slightly beyond opposite sides of said handle, follower means in eccentric engagement with said finger wheel and extending upwardly therefrom through said axial hole in said handle and further through said hole in said horizontal portion defining said medial trough in said guard plate, and a pair of levers rockable on to said guard plate on the lower side thereof on opposite sides of said medial trough.

5. A razor according to claim 4 wherein each of said levers is T-shaped and comprises a stem portion and a bar portion, and wherein said levers are rockable at points intermediate the ends of said stem portions with said bar portions outward, said stem portions extending inwardly through said slots in said vertical portions defining said medial trough in said guard plate and terminating on said follower means below said bar member, and said bar portions of said levers extending toward said extreme corners of said guard plate and terminating in engagement with said lugs passing downwardly from said cap.

6. An injector razor according to claim 4 which includes a detent spring within said handle whereby said finger wheel may be positioned in a plurality of angular orientations with respect to said handle.

7. An injector razor for flexible blades comprising a cap having a concave under surface, a downwardly extending handle, a guard plate attached to the handle, guard means integral with the guard plate, means at the corners of the cap and guard plate to maintain the same in association while permitting limited separative movement of the cap and guard plate and while permitting longitudinal movement of a razor blade through the space therebetween, a longitudinally extending blade aligning unit supported on and spring-biased upwardly from said guard plate for normally pressing the longitudinally central portion of a razor blade against the lower surface of the cap to flex the blade and extending at one end into the path of movement of a new blade in flat condition into the space between said cap and said guard plate, a stem adjustably mounted for vertical movement in said handle, a pair of levers rockable on the under side of the guard plate and each having an inner portion extending on the upper end of said stem and liftable thereby and having an outer portion bearing downwardly against a portion of the cap and adapted to limitedly move the cap toward the guard plate when its inner portion is lifted by the upward adjustment of said stem, manual stem-adjusting means mounted on the handle, actuating means for moving said stem with respect to said handle in response to the manipulation of the manually adjusting means to rock the levers to vary the relative positions of the cap and guard plate, key guiding means in a corresponding end of said guard plate adapted to receive the key of an injector magazine, and camming means adjacent to said end of said aligning unit and extending downwardly toward said end of said aligning unit for engagement by a key so guided to displace said aligning unit out of said path to permit the injection of the forward end of a blade in flat condition between the cap and guard plate and at all degrees of separation of the cap and guard plate by said levers.

8. A razor as in claim 7 wherein the blade aligning unit comprises a longitudinally-extending member having attached thereto blade-aligning means disposed along the same.

References Cited by the Examiner
UNITED STATES PATENTS

| | | | |
|---|---|---|---|
| 1,953,685 | 4/34 | Muros | 30—65 |
| 2,230,102 | 1/41 | Benjamin | 30—40.5 |
| 2,315,990 | 4/43 | Testi | 30—40.5 |
| 2,356,188 | 8/44 | Testi | 30—65 |
| 2,371,412 | 3/45 | Shnitzler | 30—65 |
| 2,392,431 | 1/46 | Testi | 30—40.5 |
| 2,392,432 | 1/46 | Testi | 30—40.5 |
| 2,436,026 | 2/48 | Steinbach | 30—40.5 |
| 2,654,149 | 10/53 | Bowen et al. | 30—64 |
| 2,686,966 | 8/54 | Landwehr | 30—64 |
| 2,871,561 | 2/59 | Gavrin | 30—65 |
| 2,952,911 | 9/60 | Shnitzler et al. | 30—60.5 |
| 3,080,651 | 3/63 | La Cas | 30—61 |

WILLIAM FELDMAN, *Primary Examiner.*

EDWARD V. BENHAM, *Examiner.*

UNITED STATES PATENT OFFICE
CERTIFICATE OF CORRECTION

Patent No. 3,171,198                          March 2, 1965

Gerald Stahl et al.

It is hereby certified that error appears in the above numbered patent requiring correction and that the said Letters Patent should read as corrected below.

Column 2, line 37, after "at" insert -- points intermediate the ends of their stem portions, with --; column 3, line 8, for "determine" read -- determinate --; column 9, line 36, for "chamber" read -- camber --; column 11, line 59, after "end" insert -- 143 --; column 15, line 46, strike out "to".

Signed and sealed this 27th day of July 1965.

(SEAL)
Attest:

ERNEST W. SWIDER
Attesting Officer

EDWARD J. BRENNER
                                             Commissioner of Patents